United States Patent [19]

Hirota et al.

[11] Patent Number: 5,734,759
[45] Date of Patent: Mar. 31, 1998

[54] IMAGE READING APPARATUS FOR SEQUENTIALLY PROVIDING RED, GREEN AND BLUE SIGNALS DURING PRESCAN AND FOR REVERSING THE ORDER DURING READING

[75] Inventors: Yoshihiko Hirota; Katsuhisa Toyama; Hiroyuki Suzuki, all of Toyokawa, Japan

[73] Assignee: Minolta Co., Ltd., Osaka, Japan

[21] Appl. No.: 611,935

[22] Filed: Mar. 6, 1996

[30] Foreign Application Priority Data

Mar. 7, 1995 [JP] Japan ................................. 7-047277

[51] Int. Cl.⁶ ............................................. H04N 1/192
[52] U.S. Cl. ........................... 382/274; 358/504; 358/514; 358/515
[58] Field of Search ....................... 358/504, 505, 358/513–516, 406, 461; 382/274; H04N 1/46, 1/192, 1/193

[56] References Cited

U.S. PATENT DOCUMENTS

| | | | |
|---|---|---|---|
| 4,922,350 | 5/1990 | Rombola et al. | 358/488 |
| 4,974,072 | 11/1990 | Hasegawa | 358/514 |
| 5,361,145 | 11/1994 | Hasegawa | 358/514 |
| 5,452,108 | 9/1995 | Muramatsu | 358/474 |
| 5,481,354 | 1/1996 | Nakajima | 355/324 |
| 5,495,340 | 2/1996 | Naito et al. | 358/516 |
| 5,500,746 | 3/1996 | Aida | 358/514 |

*Primary Examiner*—Kim Vu
*Attorney, Agent, or Firm*—Sidley & Austin

[57] ABSTRACT

An image reading apparatus comprises a photoelectric converter including three linear image sensors of red, green and blue aligned in parallel to each other along a main scan direction. When a document is scanned, a document is read by the photoelectric converter by moving it relative to the document. The moving direction is set to be a first direction, for a prescan and a second direction reverse to the first direction, for a normal scan. Analog output signals of the first to third linear image sensor are converted to digital signals. In a prescan, a selector exchanges the digital signals of the first and third linear image sensors, while in a normal scan, the selector does not exchange them. Then, a line correction section receives the digital signals of the first and third linear image sensors from the selector and the digital signals of the second linear image sensor from the analog-to-digital converter and outputs the digital signals of the first to third linear image sensors by delaying outputs of the digital signals with delay times determined in correspondence to spacial distances between positions of the three linear image sensors and a scan speed along the moving direction. Thus, image data can be read without shifts of output timings of the image data of red, green and blue.

6 Claims, 6 Drawing Sheets

IMAGE READING APPARATUS FOR SEQUENTIALLY PROVIDING RED, GREEN AND BLUE SIGNALS DURING PRESCAN AND FOR REVERSING THE ORDER DURING READING

BACKGROUND OF THE INVENTION

1. Field of the Invention

The present invention relates to a full color digital image reading apparatus used in a full color copying machine or the like which performs a prescan for obtaining information on a document before reading an image thereof.

2. Description of the Prior Art

In a digital image reproducing apparatus such as a copying machine, a prescan of a document is performed generally before reading the document. The document size and the like are determined according to the prescan data.

However, when a prescan is performed for a full color copying machine, it takes a long time and the first copy time becomes long, thus substantially decreasing the copy speed.

SUMMARY OF THE INVENTION

An object of the present invention is to provide an image reading apparatus which performs a prescan in a short time.

An image reading apparatus according to the invention uses a photoelectric converter comprising first, second and third linear image sensors of red, green and blue aligned in parallel to each other along a main scan directions, where the first to third linear image sensors are arranged at prescribed distances between them along a first direction of subscan. A scan system is moved relatively to a document to be read by the photoelectric converter. Here, a moving direction of the scan system is selected to be the first direction for a prescan or to be a second direction, reverse to the first direction, for a normal scan. Analog output signals of the first to third linear image sensors are converted to digital signals, and a selector outputs the digital signals of the first and third linear image sensors after exchanging them when a prescan is performed. A line correction means receives the exchanged digital signals of the first and third linear image sensors and the digital signals of the second linear image sensor, and outputs the digital signals of the first to third linear image sensors with delay times in correspondence to spacial distances between the positions of the three linear image sensors and a scan speed along the moving direction of the scan system.

An advantage of the present invention is that the prescan time is shortened without erroneous reading of a document even if the prescan direction is opposite to the normal scan direction.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Referring now to the drawings, wherein like reference characters designate like or corresponding parts throughout the drawings, a presently preferred embodiment of the invention is described.

A. Outline of digital full color copying machine

Figure 1:
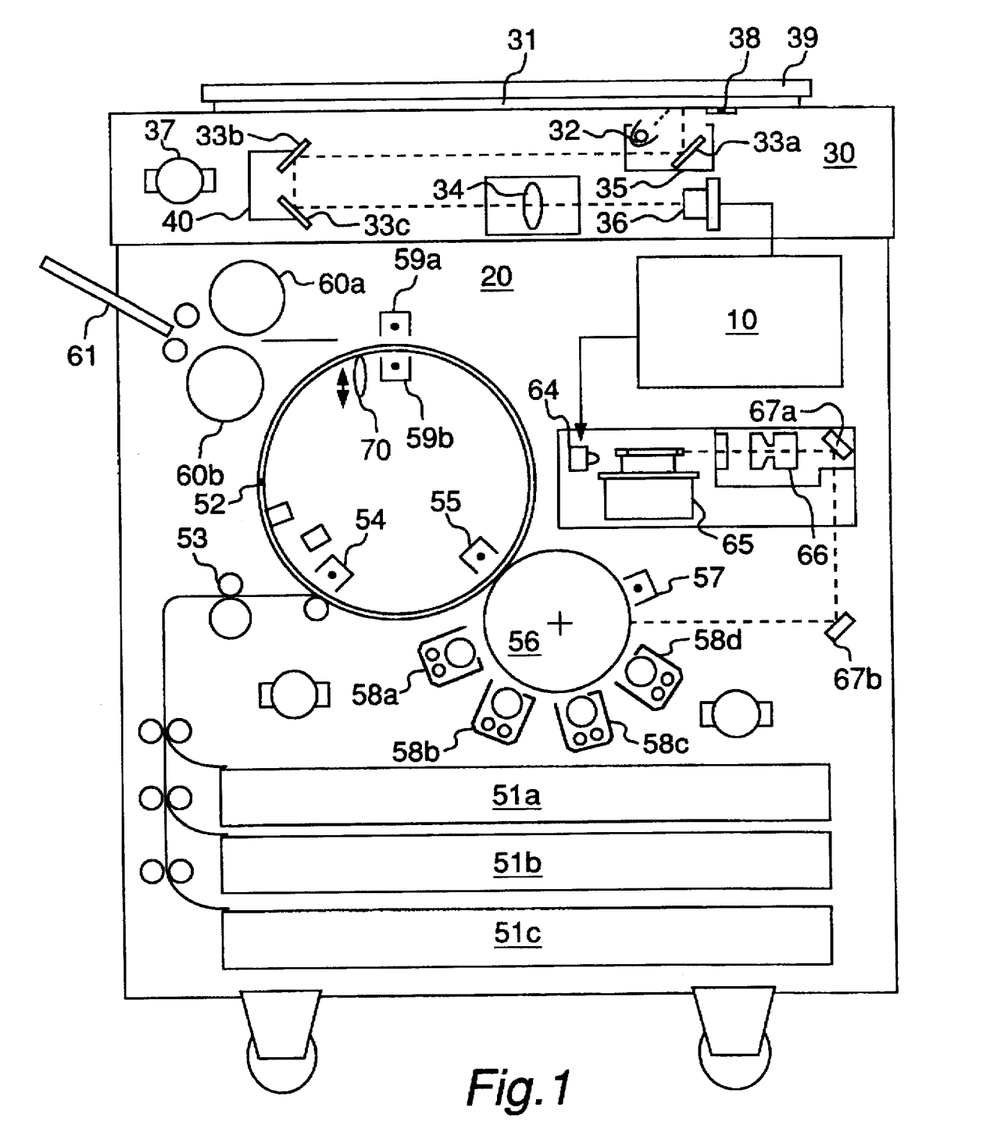
FIG. 1 is a sectional view of a digital color copying machine.

FIG. 1 shows a digital full color copying machine comprising an image scanner 30, a signal processor unit 10 and a printer section 20. The image scanner 30 reads a document image, and the digital signal processor unit 10 processes the signals outputted by the image scanner 30. The printer section 20 prints a full color or black image on a paper according to the signals received from the digital signal processor unit 10. An outline of the digital copying is explained below.

In the image scanner 30, a document is put on a platen glass 31 and covered with a plate 39, or it is fed onto a platen 31 by an automatic document feeder (not shown) if mounted. A white plate 38 for shading correction is provided at an edge of the platen glass 31. The document is exposed with a lamp 32, and a light reflected from the document is guided through mirrors 33a, 33b and 33c and focused by a lens 34 onto a linear full color sensor (CCD) 36 to be converted to electric signals of components of red, green and blue. Then, they are sent to the signal processor 10. When the document image is read, a first slider 35 and a second slider 40 are mechanically moved at a speed of V and a speed of V/2, resectively, by a motor 37 along a longitudinal direction perpendicular to an electrical scan direction of the sensor 36 so that the entire document is scanned. The image processor 10 processes the signals electrically to output components of magenta (M), cyan (C), yellow (Y) and black (Bk) and sends them to the printer section 20.

In the printer section 20, the image signals of C, M, Y and Bk received from the image processor 10 are used to drive a laser diode 64, and a laser beam emitted by the laser diode 64 propagates through a polygon mirror 65, an f-θ lens 66, mirrors 67a and 67b to expose a rotating photoconductor drum 56 charged beforehand by a charger 57 so as to form an electrostatic latent image. One of four development units 58a, 58b, 58c and 58d of toners of cyan, magenta, yellow and black is selected to develop the latent image with toners. On the other hand, a sheet of paper supplied from a cassette 51a, 51b or 51c is carried by timing rollers 53 to be wound on a transfer drum 52 with an adsorption charger 54. It is carried further to a transfer portion, and the toner image on the photoconductor drum 56 is transferred by a transfer charger 55 onto the sheet of paper. The above-mentioned printing process is repeated for each of the four colors of yellow, magenta, cyan and black. That is, toner images of the four colors, cyan, magenta, yellow and black, are transferred successively onto the sheet of paper. Then, the paper is separated from the transfer drum 52 by the separation chargers 59a and 59b and a claw 70, is passed throught the fixing rollers 60a and 60b for fixing the toner image, and is discharged onto a tray 61.

B. Image processing

Figure 2A:
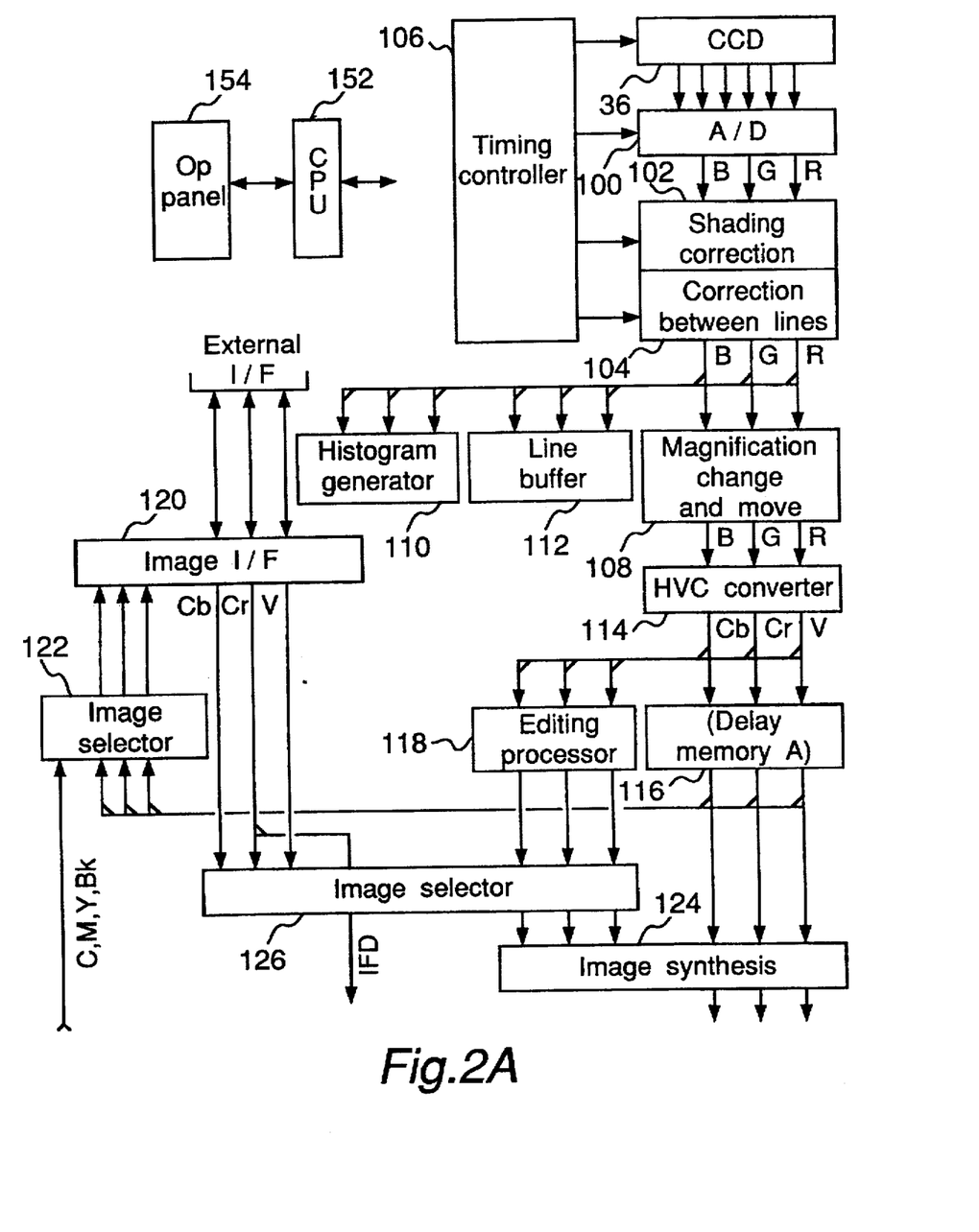
FIGS. 2A and 2B are block diagram of a signal processor.
Figure 2B:
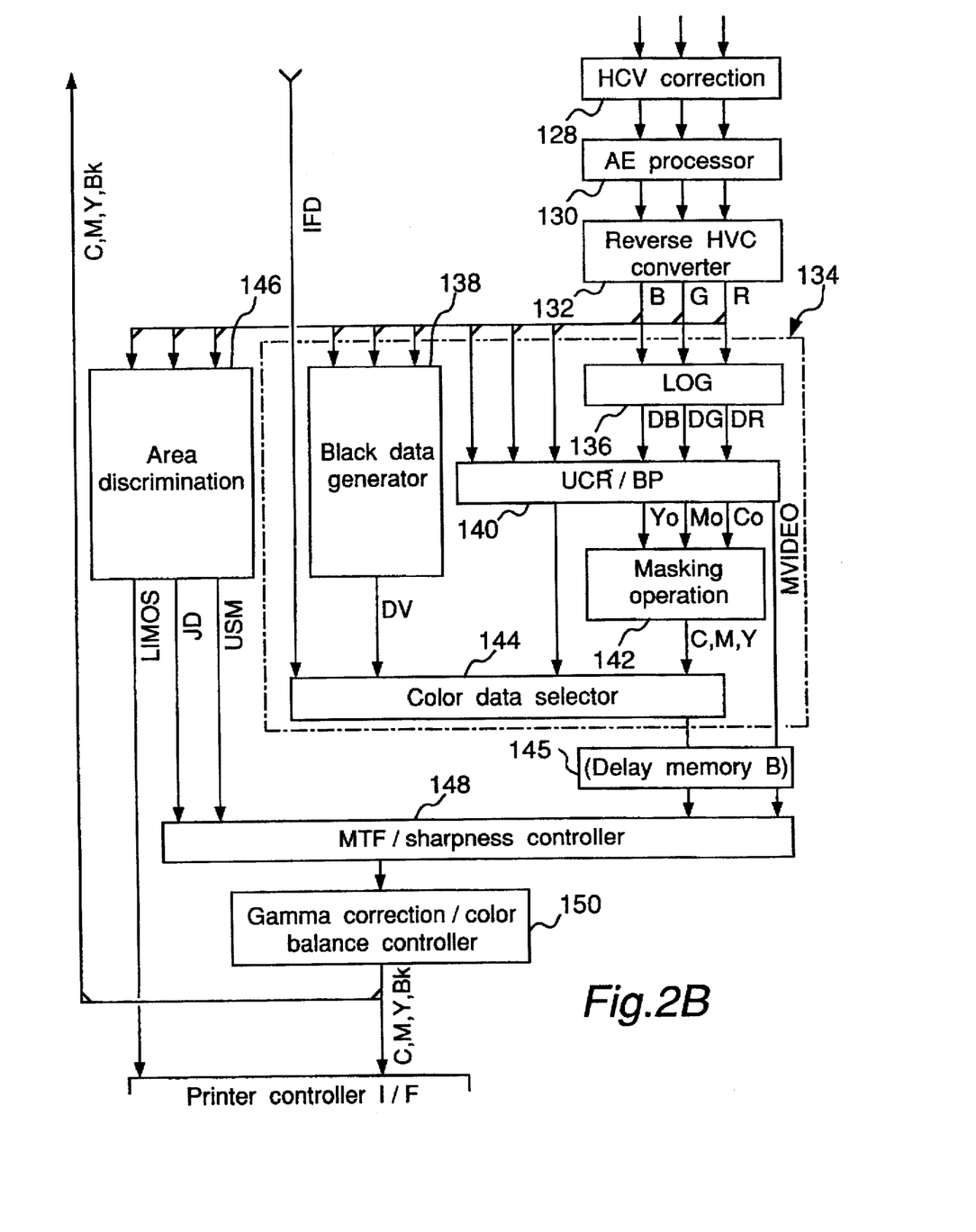

Next, image signal processing in the signal processor 10 is described. FIGS. 2A and 2B show image processing in the signal processor 10. As explained above, the signal processor 10 receives analog image signals of 400 dots per inch of red, green and blue from the linear CCD sensor 36 on which a light reflected from a document is focused. In the A/D conversion section 100, the analog image signals are converted to 8-bit digital data (256 gradation levels) of red (R), green (G) and blue (B). In order to eliminate scattering of reading of a quantity of light among CCD elements in the sensor 36 along a main scan direction for each of red, green and blue, a shading correction section 102 has stored reference data read on the white plate 38 in a memory (not shown), and when a document image is read, the data in the memory is converted to an inverted value thereof, and it is multiplied with a data on the document for shading correction. Next, a line correction section 104 adjusts the output timings of the data after shading correction according to positions of chips of red, green, and blue provided in the color CCD sensor 36, as will be explained later. A timing controller 106 controls timings for the CCD sensor 36, the A/D conversion section 100, the shading correction section 102 and the line correction section 104. Then, the line correction section 104 sends the R, G and B data to a line buffer 112 and a histogram generator 110.

The magnification change and move section 108 has two linear memories, and magnification change and movement of data along a main scan direction along the CCD sensor 36 are controlled by changing timings of write and read to and from the memories. In this section, image repeat, amplifications reduction, mirror processing and the like can be performed by the control.

The histogram generator 110 (FIG. 4) generates value signals from the R, G and B data obtained in a prescan to generate histograms. By using the histograms of the value signals, automatic color selection, background level and document mode are set automatically.

An HVC converter 114 converts the R, G and B data to value signals (V) and color difference signals (Cr and Cb). An editing processor 118 performs editing, such as color change, on the data received from the HVC converter 114 according to an instruction from an editor provided as an option.

On the other hand, an image interface 120 receives V, Cr and Cb data through an image selector 122 and sends the image data to an external equipment, or it receives image data from the external equipment. In order to deal with various types of image data, the image interface 120 has a function to convert the V, Cr and Cb data to R, G and B signals, X, Y and Z signals, L*, a* and b* signals or the like, and vice versa. Further, C, M, Y and Bk data to be supplied to the printer section 20 may be sent to the external equipment, and vice versa.

An image synthesis section 124 selects the V, Cr and Cb data received via the image interface 120 from the editor 118 or the image selector 126, and performs image synthesis of the data with other data received from the HVC converter 114 via the dealy 116 (delay memory A).

An HVC corrector 128 corrects the V, Cr and Cb data, received from the image synthesis section 124 according to an instruction given via an operational panel 154, in order to adjust image quality by a user in correspondence to three human senses of value (V), hue (H) and chroma (C).

An automatic exposure processor 130 controls background level of a document on value signals according to information obtained by the histogram generator 110.

A reverse HVC converter 132 converts the V, Cr and Cb data again to R, G and B data.

In a color correction section 134, a LOG converter 136 converts the R, G and B data received from the reverse HVC converter 132 to density data DR, DG and DB, while a monochromatic data generator 138 generates value data from the R, G and B data in a color copy mode and generates gradation data DV for a monochromatic copy in a black copy mode. An undercolor-remove/black-paint section 140 calculates a difference between a maximum and a minimum of the density data DR, DG and DB as color information and a minimum among DR, DG and DB as a black component. The DR, DG and DB data are subtracted by the minimum to generate cyan, magenta and yellow data Co, Mo and Yo, while black data Bk is generated based on the minimum to be sent to a color data selector 144. A masking operation section 142 converts the data Co, Mo and Yo to cyan, magenta and yellow data C, M and Y for color reproduction in the printer section 20, and sends them to the color data selector 144. A MVIDEO signal from the undercolor-remove/black-paint section 140 and the data outputted from the color data selector 144 are passed via delay 145 (delay memory B) to the MTF/sharpness controller 148.

On the other hand, a region discrimination section 146 discriminates regions of a black character image, a dot image and the like, and generates a result (JD signal) and a correction signal (USM signal) based on the minimum MIN(R, G, B) and a difference between the maximum and the minimum (MAX(R, G, B)–MIN(R, G, B)). Further, a LIMOS signal is send to the printer section 20 to define a duty ratio of an output period to a pixel period. The output period means a period when a signal is outputted. The LIMOS signal is set to improve compatibility of reproduction of black characters and granularity of toner image.

An MTF correction/sharpness control section 148 performs various processing such as edge emphasis or smoothing on the data according to results obtained by the image discrimination section 146 for correcting a copy image appropriately.

A gamma correction/color balance section 150 controls a gamma curve (gradation correction curve) and color balance of C, M, Y and Bk data automatically or according to instruction given by the operational panel 154. Then, the C, M, Y and Bk data and the LIMOS signal are sent to the printer section 20.

A CPU 152 controls the signal processor 10, and the operational panel 154 is used to give data and to display data.

C. Prescan and line correction

In this embodiment, prescan is performed for determining document type and the like. In order to shorten the first copy time, the scan unit 35 in the image scanner 30 has been positioned near the white plate 38 for shading correction before the prescan. It is a feature of the embodiment that the prescan is started along a direction opposite to that of the normal scan. The normal scan starts from a document reference position opposite to the white plate 38. When the start button in the operational panel 154 is pressed, the light source 32 is turned on, and the scanner 30 scans the white plate 38 and scans the document to generate histogram data thereof. Then, it returns to the document reference position. Automatic exposure, automatic color selection and the like are determined according to the generated histogram data, and a normal scan is started.

Figure 3:
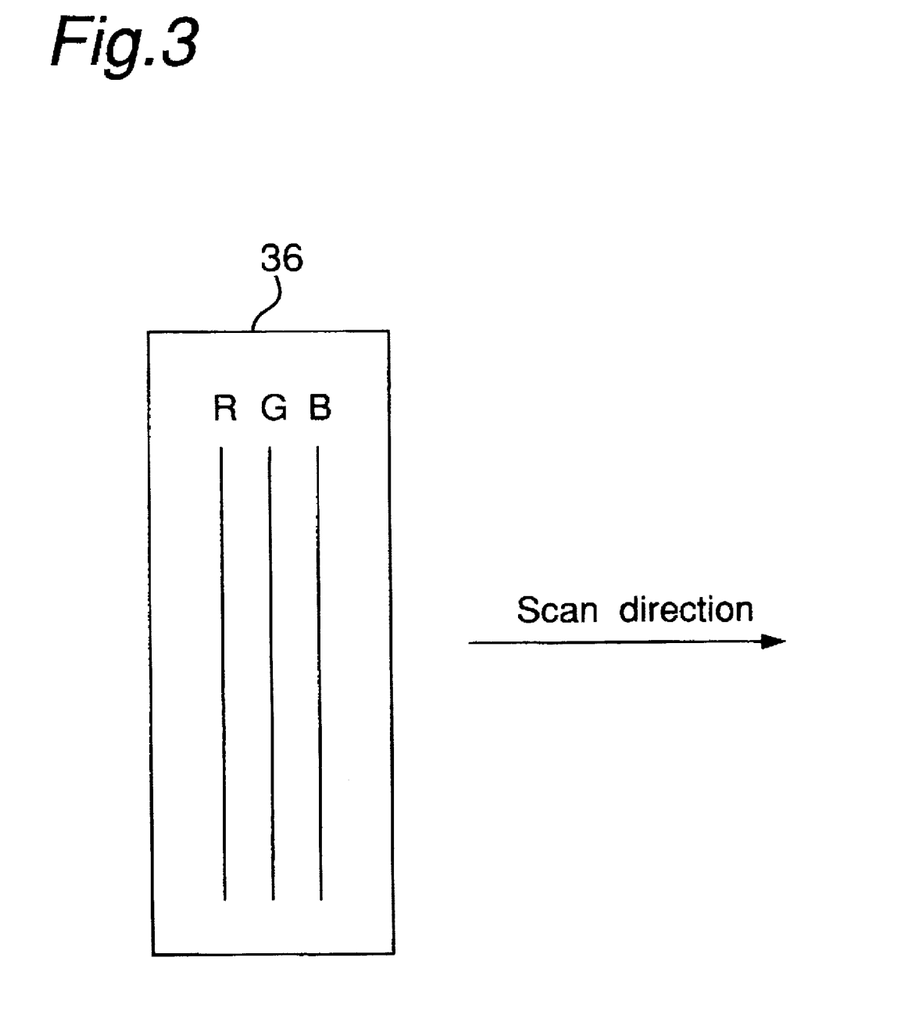
FIG. 3 is a plan view of a CCD sensor.

As shown in FIG. 3, the CCD sensor 36 comprises three chips for three colors as denoted as "R", "G" and "B" which output analog signals for red, green and blue. The CCD sensor 36 is operated according to driving signals ØTG, ØR and the like supplied from the timing controller 106. The chips are arranged in parallel to each other with equal distances between them and perpendicular to the subscan direction. Therefore, an image is read by the linear sensors of red, green and blue at different times. The A/D converter 100 converts the analog signals to digital signals R, G, B of red, green and blue. Then, the line correction section 104 is provided to adjust output timings of the data R, G and B.

For example, the three chips of the CCD sensor 36 are arranged in parallel to each other with a distance of eight lines between them. Then, if $m_y$ denotes a magnification along the subscan direction depending on scan speed, a read position shifts by $8*m_y$ lines between red and green, and by 16*$m_y$ lines between red and blue. The line correction section 104 corrects the shifts of read position by adjusting output times of red and green data with respect to that of blue data.

Figure 4:
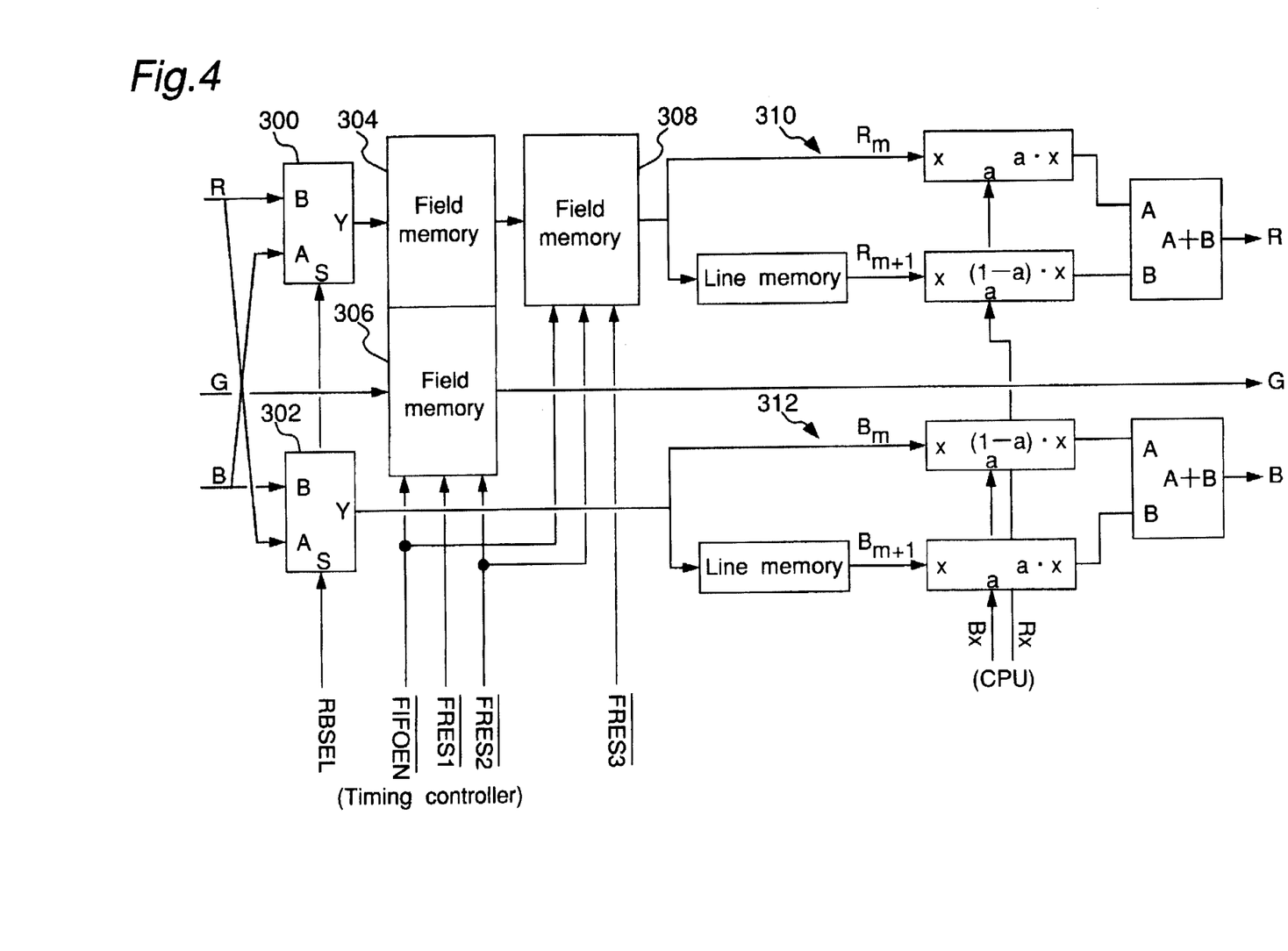
FIG. 4 is a block diagram of a line correction section.

However, as described above, the position relation of red, green and blue data is reversed in the prescan because the scan direction is reversed. In the normal scan, the chip for red reads a document first, while in the prescan, the chip for blue read the document first. If this difference is not processed suitably, analysis of prescan data may include errors. Then, at a front stage in the line correction section 104, red and blue lines can be interchanged to solve this problem. FIG. 4 shows a block diagram of the line correction section 104. Data of red (R) and blue (B) received from the shading correction section 102 are supplied to selectors 300 and 302 and can be interchanged according to a selection signal RBSEL supplied by the timing controller 106. The selection signal RBSEL is set at "L" level for a prescan to interchange signal lines for red and blue, while at "H" level for a normal scan. Then, phase differences in control signals $\overline{FRES1}$, $\overline{FRES2}$, $\overline{FRES3}$ and extrapolation data RX, BX are the same as in the normal scan.

Various other techniques may be proposed to eliminate the shift of read position in the prescan. For example, a delay memory for a line for blue is provided besides lines for red and green provided with delay memories. However, this makes the line correction section large and increases its cost. It may also be proposed to interchange signal lines for red and blue between the A/D converter 100 and the shading correction section 102. However, in this case, shading correction data for red and blue also has to be interchanged, and this increases a size of the apparatus.

Turning again to FIG. 4, the data of red (R) and blue (B) from the shading correction section 102 are sent to the selectors 300 and 302. The data of red (R) or blue (B) are stored in a field memory 304. On the other hand, the data of green (G) from the shading correction section 102 are stored in another field memory 306. The data of red (R) or blue (B) stored in the field memory 304 are stored again in a field memory 308 for line correction delayed according to phase differences in the control signals $\overline{FRES1}$, $\overline{FRES2}$, $\overline{FRES3}$. Each of the field memories 304, 306 and 308 has a first-in first-out structure and has a capacity of 256 k*8 bits. If a line has 100 dots, they can store 54 lines and meet a magnification up to 54/8=6.75.

Figure 5:
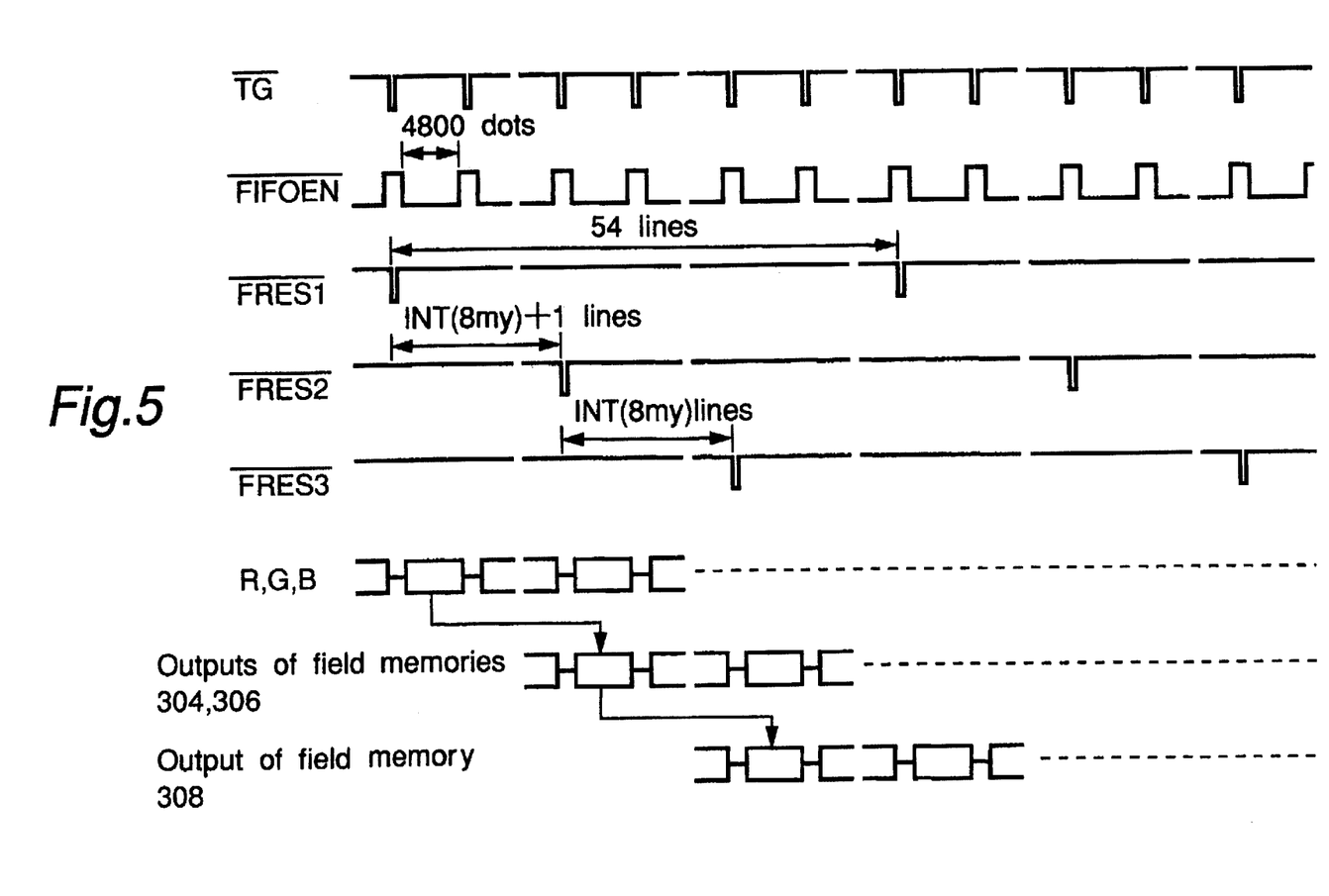
FIG. 5 is a timing chart of the line correction section.

FIG. 5 shows a timing chart for illustrating an operation of the line correction section 104. $\overline{FIFOEN}$ shows an effective scan area in main scan of the image data stored in the field memories 304 and 306, and its width is 4,800 dots. Periods of $\overline{FRES1}$, $\overline{FRES2}$, $\overline{FRES3}$ are 54 lines, and phase differences between $\overline{FRES1}$ and $\overline{FRES2}$ and between $\overline{FRES2}$ and $\overline{FRES3}$ are INT(8*$m_y$)+1 lines where $m_y$ denotes magnification along the subscan direction. Thus, the data of one of red (R) and blue (B) are delayed by the two field memories 304 and 308, the data of green (G) are delayed by the field memory 306, and the data of the other of red (2) and blue (8) are not delayed.

Because the field memories can correct only in the unit of magnification of 1/8, interpolation is performed on red and blue with those stored in line memories to be delayed by one line. Then, the interpolation is performed in the unit of magnification of 1/2,048 according to interpolation data BX and RX supplied by the CPU. The detailed explanation of this interpolation is omitted here.

Though the above-mentioned embodiment relates to a digital full color copying machine where the color image data read by the CCD sensor 36 is supplied to the printer, the data may also be supplied to a printer, a memory unit or the like A read speed can be shortened by about a half by reciprocating movement of the scanner by a relatively simple modification of the image processor, while a prescan can be performed similarly to a normal scan. Thus, a first copy time can be shortened.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reading apparatus comprising:

a photoelectric converter comprising first, second and third linear image sensors aligned in parallel to each other along a main scan direction, the first to third linear image sensors being arranged at respective positions with prescribed distances between them along a first direction of subscan, one of the three linear image sensors providing an analog output signal responsive to red light, another of the three linear image sensors providing an analog output signal responsive to green light, and the remaining one of the three linear image sensors providing an analog output signal responsive to blue light;

a scan system for scanning a document to be read by said photoelectric converter by moving said scan system relative to the document, a moving direction of said scan system being able to be set to be a first direction or a second direction, which is reverse to the first direction;

an analog-to-digital converter for converting the analog output signals of the first to third linear image sensors to digital signals;

a selector which outputs the digital signals of the first and third linear image sensors with the digital signals of the first linear image sensor being outputted prior to the outputting of the digital signals of the third linear image sensor when the moving direction of said scan system is set to be the second direction and which exchanges the digital signals of the first and third linear image sensors so as to output the digital signals of the third linear image sensor prior to the outputting of the digital signals of the first linear image sensor only when the moving direction of said scan system is set to be the first direction; and a line correction means for receiving the digital signals of the first and third linear image sensors from said selector and the digital signals of the second linear image sensor from said analog-to-digital converter and for outputting the digital signals of the first to third linear image sensors by delaying the digital signals of the second linear image sensor and the digital signals of one of the first and third linear image sensors with delay times which are determined in correspondence to spacial distances between the respective positions of the three linear image sensors and a scan speed of said scan system along the moving direction of said scan system.

2. The image reading apparatus according to claim 1, wherein said line correction means comprises three memory means, two of the three memory means being connected in series for storing the digital signals of one of the first linear image sensor and the third linear image sensor, and a third one of the three memory means storing the digital signals of the second linear image sensor, for delaying the output of the digital signals, of said second linear image sensor and said one of the first linear image sensor and the third linear image sensor, with the respective delay times.

3. The image reading apparatus according to claim 1, wherein the moving direction of said scan system is the first direction for a prescan and is the second direction for a normal scan.

4. The image reading apparatus according to claim 1, further comprising a white reference plate, for shading correction, located at a periphery of a platen glass on which a document is placed, wherein the scan system is located at a position to read the white reference plate before a prescan.

5. The image reading apparatus according to claim 1, further comprising interpolation means for storing data of one line of the digital data of the first and third linear image sensors received from said line correction means and for interpolating the digital signals of the first and third linear image sensors relatively to digital signals of the second linear image sensor.

6. An image reading apparatus comprising:

a plurality of line sensors, each of which provides image signals, said plurality of line sensors being arranged at respective positions with a prescribed distance between them along a first direction;

a scanning system which scans a document, to be read, by moving said plurality of line sensors along a moving direction with respect to the document, said scanning system being able to set said moving direction to be said first direction or to be a second direction which is reverse to said first direction; and a line correction circuit which delays image signals of one of said plurality of line sensors with respect to image signals of another of said plurality of line sensors with a delay time which is determined in correspondence to a distance between said one of said plurality of line sensors and said another of said plurality of line sensors when the document is scanned in said first direction by said scanning system, and which delays image signals of said another of said plurality of line sensors with respect to image signals of said one of said plurality of line sensors by said delay time when the document is scanned in said second direction by said scanning system.

* * * * *